US011075904B2

(12) United States Patent
Jha et al.

(10) Patent No.: US 11,075,904 B2
(45) Date of Patent: Jul. 27, 2021

(54) BIOMETRIC INTERACTION MANAGER

(71) Applicant: Visa International Service Association, San Francisco, CA (US)

(72) Inventors: Shipra Jha, Fremont, CA (US); Anup Tripathi, Foster City, CA (US); Prithviraj Choudhury, Fremont, CA (US)

(73) Assignee: Visa International Service Association, San Francisco, CA (US)

( * ) Notice: Subject to any disclaimer, the term of this patent is extended or adjusted under 35 U.S.C. 154(b) by 312 days.

(21) Appl. No.: 16/292,018

(22) Filed: Mar. 4, 2019

(65) Prior Publication Data

US 2020/0287897 A1  Sep. 10, 2020

(51) Int. Cl.
*H04L 29/06* (2006.01)
*H04L 9/32* (2006.01)

(52) U.S. Cl.
CPC ........ *H04L 63/0861* (2013.01); *H04L 9/3231* (2013.01); *H04L 63/0853* (2013.01); *H04L 63/107* (2013.01); *H04L 63/123* (2013.01)

(58) Field of Classification Search
CPC combination set(s) only.
See application file for complete search history.

(56) References Cited

U.S. PATENT DOCUMENTS

| | | | |
|---|---|---|---|
| 8,255,327 B2 | 8/2012 | Kemper et al. | |
| 8,554,685 B2 | 10/2013 | Patterson et al. | |
| 9,996,815 B2 * | 6/2018 | Chin | G06Q 10/087 |
| 10,154,029 B1 * | 12/2018 | Griffin | H04L 9/0866 |
| 10,257,178 B2 * | 4/2019 | Carpenter | H04L 63/08 |
| 2002/0112177 A1 * | 8/2002 | Voltmer | G07F 7/1008 726/26 |
| 2003/0065541 A1 * | 4/2003 | Menninger | G06Q 10/06 705/7.11 |
| 2004/0039823 A1 * | 2/2004 | Le Pennec | H04L 69/329 709/227 |

(Continued)

OTHER PUBLICATIONS

Supplementary Search Report dated May 11, 2020 for EP Application No. 20160786.8, 7 pages.

*Primary Examiner* — Piotr Poltorak
(74) *Attorney, Agent, or Firm* — Kilpatrick Townsend & Stockton LLP (57) ABSTRACT

A method and system for processing a transaction based on biometric data and access data is disclosed. Different accounts and providers may be used to process transactions, using different message formats, based on user-configured mappings. In one example, the method includes receiving, by a message processing system, an authorization request message from an access device, the authorization request message comprising a biometric template and access data. An interaction entity record identifier, associated with an interaction entity from among a plurality of different interaction entities that process messages in different message formats, may be retrieved. The authorization request message may be converted from a first format to a second format, the second format being compatible with message processing by the interaction entity. The converted authorization request message may be transmitted to the interaction entity for determining whether to authorize the transaction.

20 Claims, 5 Drawing Sheets

(56) References Cited

U.S. PATENT DOCUMENTS

| | | | |
|---|---|---|---|
| 2005/0210261 A1* | 9/2005 | Kamperman | H04N 21/4367 |
| | | | 713/182 |
| 2010/0250944 A1* | 9/2010 | Suzuki | H04L 63/0861 |
| | | | 713/172 |
| 2012/0278205 A1* | 11/2012 | Chin | G06Q 10/087 |
| | | | 705/28 |
| 2013/0232073 A1 | 9/2013 | Sheets et al. | |
| 2014/0019352 A1 | 1/2014 | Shrivastava | |
| 2015/0229638 A1* | 8/2015 | Loo | H04L 67/02 |
| | | | 726/9 |
| 2017/0134375 A1 | 5/2017 | Wagner | |
| 2017/0262853 A1* | 9/2017 | Williamson | G06Q 20/4016 |
| 2018/0091505 A1* | 3/2018 | Farrell | H04L 63/0861 |
| 2019/0222422 A1* | 7/2019 | Purves | H04L 61/15 |

* cited by examiner

BIOMETRIC INTERACTION MANAGER

BACKGROUND

Current methods of interaction involve a large number of steps and are not particularly flexible or adaptable. For example, a person trying to obtain access to data on a secure server may need to open an application, enter a password, and then enter a biometric into the application. The type of data desired is selected, and is then retrieved. In another example, digital wallets provide a convenient way for a user to pay with a selected payment instrument using a mobile device. However, the process for paying for goods or services with a digital wallet involves several steps. First, the user initiates a transaction by opening a digital wallet on a mobile device. The user may be prompted to provide biometrics (e.g., by using a fingerprint reader or camera on the mobile device). The user must manually select a payment instrument. Typically, the available payment instruments are limited to credit cards. Once the payment instrument has been selected by the user, the user will bring the user's mobile device in contact with a merchant access device, and the payment will be processed using the selected payment instrument. Note that in these exemplary situations, only one mode of interaction (e.g., one type of data to retrieve or one type of payment method to be processed) is available.

It would be desirable if interaction methods could involve the use of fewer steps, while being more flexible to allow for more than one interaction mode.

Embodiments address these and other problems, individually and collectively.

BRIEF SUMMARY

Embodiments are directed to methods and systems for processing a transaction based on biometric data and access data. Different accounts and providers may be used to process the transaction, using different message formats, based on user-configured mappings.

One embodiment is directed to a method comprising: receiving, by a message processing system, an authorization request message from an access device, the authorization request message comprising a biometric template and access data; retrieving, by the message processing system from a configuration database, an interaction entity record identifier associated with an interaction entity from among a plurality of different interaction entities that process messages in different message formats; initiating, by the message processing system, validation of the biometric template; upon a determination that the biometric template is valid, then converting the authorization request message from a first format to a second format, the second format being compatible with message processing by the interaction entity; transmitting the authorization request message in the second format to the interaction entity; receiving, by the message processing system, an authorization response message in the second format from the interaction entity; converting the authorization response message from the second format to the first format; and transmitting, by the message processing system, the authorization response message in the first format to the access device.

Another embodiment is directed to a message processing system comprising: a processor; and a non-transitory computer-readable medium coupled to the processor, the non-transitory computer-readable medium comprising code, executable by the processor, to implement a method comprising: receiving, by the message processing system, an authorization request message from an access device, the authorization request message comprising a biometric template and access data; retrieving, by the message processing system from a configuration database, an interaction entity record identifier associated with an interaction entity from among a plurality of different interaction entities that process messages in different message formats; initiating, by the message processing system, validation of the biometric template; upon a determination that the biometric template is valid, then converting the authorization request message from a first format to a second format, the second format being compatible with message processing by the interaction entity; transmitting the authorization request message in the second format to the interaction entity; receiving, by the message processing system, an authorization response message in the second format from the interaction entity; converting the authorization response message from the second format to the first format; and transmitting, by the message processing system, the authorization response message in the first format to the access device.

Another embodiment is directed to a non-transitory computer readable medium comprising code, executable by a processor, configured to: receive, by a message processing system, an authorization request message from an access device, the authorization request message comprising a biometric template and access data; retrieve, by the message processing system from a configuration database, an interaction entity record identifier associated with an interaction entity from among a plurality of different interaction entities that process messages in different message formats; initiate, by the message processing system, validation of the biometric template; upon a determination that the biometric template is valid, then convert the authorization request message from a first format to a second format, the second format being compatible with message processing by the interaction entity; transmit the authorization request message in the second format to the interaction entity; receive, by the message processing system, an authorization response message in the second format from the interaction entity; convert the authorization response message from the second format to the first format; and transmit, by the message processing system, the authorization response message in the first format to the access device.

These and other embodiments are described in further detail below.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

I. Definitions

Prior to discussing the details of some embodiments, description of some terms may be helpful in understanding the various embodiments.

A "user" can be a person or thing that employs some other thing for some purpose. A user may include an individual that may be associated with one or more personal accounts and/or mobile devices. The user may also be referred to as a cardholder, account holder, or consumer in some embodiments.

A "user device" may be any suitable device that is operated by a user. Suitable user devices can be portable, and can communicate with external entities such as portable devices. Examples of user devices include mobile phones, laptop computers, transponders, wearable devices such as smart watches, smart media, etc.

An "interaction" can be a reciprocal action, effect, or influence. An interaction, for example, could be an exchange or transaction between two or more parties.

An "interaction entity" may typically refer to a business entity (e.g., an issuer such as a bank) that maintains an account for a user. An interaction entity may also issue payment credentials stored on a user device, such as a cellular telephone, smart card, tablet, or laptop to the consumer. An interaction entity may manage non-payment interactions such as access to a secure location, access to a secure file, etc.

An "interaction entity record identifier" may be an identifier of a particular record managed by an interaction entity, such as a bank account, transit pass, cryptocurrency wallet, line of credit, and the like. The identifier may be any suitable information that identifies the record. Examples of an interaction entity record entity identifier may include a PAN (primary account number or "account number"), an account name, and a cryptographic key.

A "resource providing entity" may be an entity that may make resources available to a user. Resource providing entities may also be known as resource providers. Examples of resource providing entities include resource providers, vendors, suppliers, owners, traders, wallet providers, service providers, and the like. In some embodiments, such entities may be a single individual, small groups of individuals, or larger groups of individuals (e.g., companies, governmental agencies). Resource providing entities may be associated with one or more physical locations (e.g., supermarkets, malls, stores, etc.) and online platforms (e.g., e-commerce websites, online companies, etc.). In some embodiments, resource providing entities may make available physical items (e.g., goods, products, etc.) to the user. In other embodiments, resource providing entities may make available digital resources (e.g., electronic documents, electronic files, etc.) to the user. In other embodiments, resource providing entities may manage access to certain resources by the user. In some embodiments, resource providing entities may make available access to a secure location. In some embodiments, the resources may be services (e.g., digital wallet services).

A "communication" can be a connection between entities or devices allowing the imparting or exchange of information, data, or news. A communication, for example, could be the sending or receiving of information between two or more computers.

An "application program interface" or "API" may include software specifying how components of a system should interact. The API may comprise a set of routines, protocols, and tools on which software applications may be built. An API may be used for a web-based system, operating system, database system, computer hardware or software library, and may include specifications for routines, data structures, object classes, variables and/or remote calls.

"Authentication" may include a process for verifying an identity of something (e.g., a user). One form of authentication can be biometric authentication.

A "biometric" may be any human characteristic that is unique to an individual. For example, a biometric may be a person's fingerprint, voice sample, face, DNA, retina, etc.

A "biometric reader" may include a device for capturing data from an individual's biometric sample. Examples of biometric readers may include fingerprint readers, front-facing cameras, microphones, and iris scanners.

A "biometric sample" may include data obtained by a biometric reader. The data may be either an analog or digital representation of the user's biometric, generated prior to determining distinct features needed for matching. For example, a biometric sample of a user's face may be image data. In another example, a biometric sample of a user's voice may be audio data.

A "biometric template" or "biometric sample template" may include a file containing distinct characteristics extracted from a biometric sample that may be used during a biometric authentication process. For example, a biometric template may be a binary mathematical file representing the unique features of an individual's fingerprint, eye, hand or voice needed for performing accurate authentication of the individual.

A "key" may refer to a piece of information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc.

A "digital signature" may include a type of electronic signature that encrypts documents with digital codes that are particularly difficult to duplicate. A digital signature may include data used to provide assurance or evidence as to the origin and identity of an electronic record or message. Digital signatures can be based on public key cryptography (i.e. asymmetric cryptography). Digital signatures may be generated using a public key algorithm such as RSA. To create a digital signature, signing software may be used to create a one-way hash of electronic data that is to be signed by a signing entity. A private key of the signing entity is then used to encrypt the hash and form the digital signature. In other cases, a symmetric key of a symmetric key pair can be used to create a digital signature.

The term "validation" may include the act of checking or affirming that information is legitimate. An example may be the act of checking that a digital signature appended to an electronic record is, in fact, legitimate and was signed by the entity that alleges creation of the digital signature. In some embodiments, digital signatures may be validated according to a verification algorithm in conjunction with a signing entity's public key. In other cases, if underlying data was signed using a symmetric key of a symmetric key pair, the signature can be validated with the corresponding symmetric key.

"Access data" may include any suitable data that can be used to access a resource or create data that can access a resource. In some embodiments, access data may be account information for a payment account. Account information may include a PAN, payment token, expiration date, verification values (e.g., CVV, CVV2, dCVV, dCVV2), etc. In other embodiments, access data may be data that can be used to activate account data. For example, in some cases, account information may be stored on a mobile device, but may not be activated until specific information is received by the mobile device. This specific information may be characterized as access data in some embodiments. Such information may be ticket information for an event, data to access a building, transit ticket information, etc.

"Access data parameters" may include a type or category of access data. An access data parameter may be a category of resource provider, such as a grocer or a transit agency. An access data parameter may be a type of resource, such as beverages, medical services, car parts, bus rides, etc. Alternatively, or additionally, access data parameters may be based on a specific resource provider or resource (e.g., Jane's Cafe or the #7 bus). An access data parameter may be transaction-specific, such as a time of day, location, amount, or user associated with initiating a transaction.

An "authorizing entity" is an entity which can authorize or approve interactions. An authorizing entity may typically refer to a business entity (e.g., an issuer, or bank) that maintains an account for a user and is capable of authorizing interactions such as payment transactions, for example the purchase of goods or services.

An "authorization request message" may be an electronic message that requests authorization for a transaction. In some embodiments, it is sent to a transaction processing computer and/or an issuer of a payment card to request authorization for a transaction. An authorization request message, according to some embodiments, may comply with International Organization for Standardization (ISO) 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g. point of sale equipment) that indicates approval of the transaction. The code may serve as proof of authorization.

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "processor" may refer to any suitable data computation device or devices. A processor may comprise one or more microprocessors working together to accomplish a desired function. The processor may include a CPU that comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

II. System Overview

Figure 1:
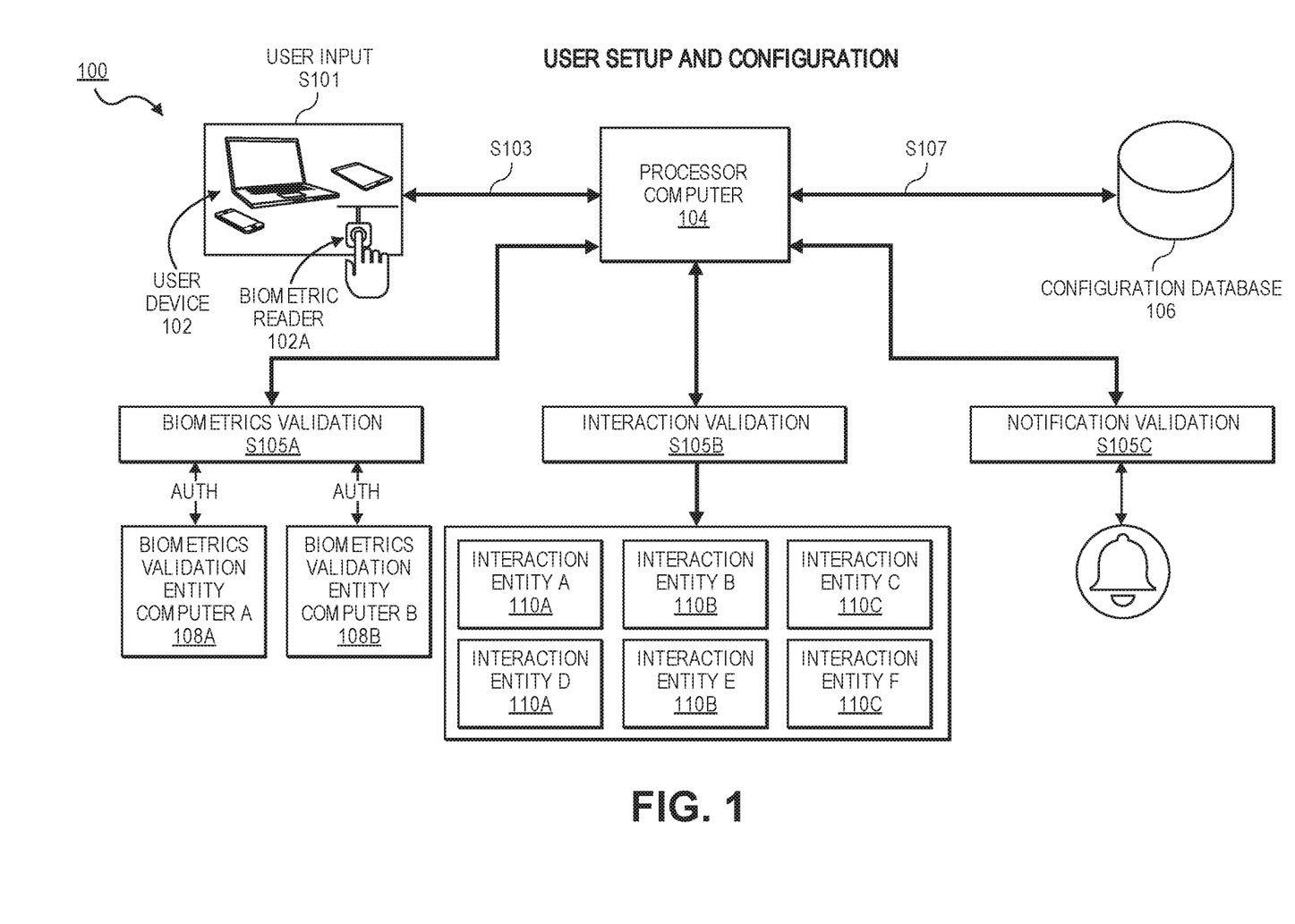
FIG. 1 shows a system and method for user setup and configuration according to some embodiments.

FIG. 1 shows a schematic diagram illustrating a system 100 according to some embodiments. The system 100 comprises a user device 102, a processor computer 104, a configuration database 106, biometrics validation entity computer A 108A, biometrics validation entity computer B 108B, and interaction entities 110A—110F. The system may further comprise a switching computer 112 (shown in FIGS. 4 and 5).

For simplicity of illustration, a certain number of components are shown in FIG. 1. It is understood, however, that embodiments may include more than one of each component. In addition, some embodiments may include fewer than or greater than all of the components shown in FIG. 1.

The interaction entities 110A, 110B, 110C, 110D, 110E, and 110F may manage interactions related to access to a resource. Managing interactions may include allocating funds and determining whether funds are available for interactions. For example, interaction entity A may be a bank, interaction entity B 110B may be a prepaid card provider, interaction entity C 110C may be a digital wallet provider, interaction entity D 110D may be a credit card issuer, interaction entity E 110E may be a cryptocurrency provider, and interaction entity F 110F may be a securities brokerage. Additional examples of interaction entities include a transit provider and a secure access provider (e.g., for a secure location).

The interaction entities 110A, 110B, 110C, 110D, 110E, and 110F may include functionality to receive authorization request messages for requests to grant access to a resource. The interaction entities 110A, 110B, 110C, 110D, 110E, and 110F may include functionality to make a determination whether to grant access to a resource based on information in the authorization request message. For example, an authorization request message may specify a bank account number and a purchase price, and an interaction entity may look up the bank account to determine if some amount in excess of the purchase price is available. As another example, an authorization request message may specify an employee identification number and access code which are used to grant access to a secure building. The interaction entities 110A, 110B, 110C, 110D, 110E, and 110F may include functionality to transmit authorization response messages indicating whether to grant access to the resource.

The biometric reader 102A may be any suitable reader capable of capturing a biometric. The biometric reader 102A may output a biometric sample. Examples of the biometric reader 102A include fingerprint readers, front-facing cameras, microphones, iris scanners, and the like.

The biometric reader 102A may a component of the user device 102. Alternatively, the biometric reader 102A may be coupled to the user device 102, for example, near field communication (NFC), LAN, a universal serial bus (USB), or any other suitable way to couple may be used.

The user device 102 may be any suitable device such as a mobile phone, laptop computer, tablet, or the like. The user device may include functionality to accept data from a user. The user device may include functionality to transmit data to the processor computer 104. The user device 102 may be connected to the processor computer 104 directly or via a communication network.

The user device 102 may include software capable of supporting processing of biometric samples. The user device 102 may execute an application capable of converting a biometric sample into a biometric template.

The user device 102 may include hardware and/or software capable of receiving user input. The user device 102 may include a keyboard, touchscreen, microphone, and/or the like for receiving configuration data from the user.

The configuration data may correspond to user-selected interaction entities corresponding to one or more access data parameters. For example, the user may specify a set of interaction entities comprising a bank and two credit card providers. For each of the interaction entities, the user may specify one or more interaction entity record identifiers such as a bank account number (represented by 16 digit debit card or direct Bank ACH), a credit card number (represented by a 16 digits if credit card), a prepaid card account number, and/or identifiers corresponding to accounts such as home equity lines of credit, securities, and electronic coins. Each interaction entity record identifier may be linked to one or more access data parameters. For example, the user may select different payment accounts for different authorized users, types of goods, types of merchants, etc., as further described below with respect to FIG. 2.

The user device 102 may include software for accepting and managing the configuration data (e.g., a mobile application). As an example, when a user navigates to a mobile application for configuration, the user device 102 may display, via a user interface, a set of access data parameters which the user may drag and drop into boxes corresponding to different interaction entity records (e.g., a particular bank account, credit card number, electronic coin wallet, and/or the like). The user's placement of the access data parameters may cause the user device 102 (and/or the processor computer 104) to generate a computer-readable mapping of access data parameters to interaction entity record identifiers. The user device 102 may, directly or via the processor computer 104, transmit such mappings to the configuration database 106 for storage.

The configuration database 106 may be a storage unit and/or device (e.g., a file system, database, collection of tables, or other storage mechanism) for storing data. The configuration database 106 may include multiple different storage units and/or devices. The configuration database 106 may store mappings of users, interaction entities, and access data. Examples of data that may be stored to the configuration database 106 are further detailed below with respect to FIG. 2.

The processor computer 104 may include functionality to identify a mapping based on a received biometric template and to process a transaction based on the parameters defined by the mapping. Processor computer 104 may be disposed between the user device 102 and the configuration database 106. The processor computer 104 may use any suitable wired or wireless network, including the Internet. The components of the processor computer 104, according to some embodiments, are described in further detail below with reference to FIG. 3.

The processor computer 104 and the access device 114 may be communicatively coupled to a switching computer 112 (shown in FIGS. 4 and 5) for switching an authorization request from a biometrics-based, interaction-entity agnostic format to a format specific to a particular interaction entity. The switching computer 112 may receive and process switch information for making the switch. The switch information may include a selected interaction entity and interaction entity record identifier, along with any additional information retrieved from the configuration database such as contact information, alert settings, spending limits, and the like. The switching computer 112 is described in detail with respect to FIGS. 4 and 5. The processor computer 104, the switching computer 112, and the configuration database 106 may be collectively referred to as a "message processing system."

The biometrics validation entity computers 108A and 108B may be entities for validating biometric data. A biometrics validation entity computer (e.g., biometrics validation entity computers 108A and 108B) may include a memory storing a matching algorithm. The biometrics validation entity computer may use the matching algorithm to compare a first biometric template (e.g., received in connection with a transaction) with a second biometric template (e.g., a stored biometric template) to determine a match result. The memory of a biometrics validation entity computer may store biometric templates for comparison to a received biometric template. Alternatively, or additionally, the biometrics validation entity computer (e.g. 108A or 108B) may receive the stored biometric template from the processor computer 104.

Alternatively, or additionally, the processor computer 104 may include functionality to validate biometric data. The processor computer may 104 may store matching algorithms for comparison of biometric templates. The processor may retrieve stored biometric templates from the configuration database 106 for validating a received biometric template and/or forwarding to a biometrics validation entity computer (e.g., 108A, 108B) for validation.

III. User Setup and Configuration

With continued reference to FIG. 1, example operations for user setup and configuration are shown. At step S101, a user may interact with user device 102 to initiate the setup process. The user may enter a biometric sample via biometric reader 102A. As examples, the biometric sample may correspond to fingerprint data, retinal data, facial data, voice data, etc. The user may further enter configuration parameters via the user device 102 (e.g., via a keyboard, touchscreen, voice recognition apparatus, or the like).

The user device 102 may convert the biometric sample to a biometric template. The user device 102 may identify key points in the biometric sample (e.g., bifurcation points in a fingerprint). The user device may map the key points and fit the key points to a mathematical algorithm.

At step S103, the user device 102 may transmit the configuration parameters and the biometric template to the processor computer 104. The user device 102 may transmit the configuration parameters and biometric template via wired or wireless transmission, an API push, and/or the like.

At step S105A, the processor computer 104 may transmit the biometric data to a biometrics validation entity computer (e.g., biometrics validation entity computer A 108A or biometrics validation entity computer B 108B). The biometrics validation entity computer may then execute biometric validation operations. The biometrics validation entity computer may retrieve a stored biometric template. The stored template may be identified, for example, based on received configuration parameters such as the user's name, identification number, etc. The biometrics validation entity computer may compare the stored biometric template to the received biometric template using a matching algorithm. If a match is found, then the received biometrics may be validated. Alternatively, or additionally, processor computer 104 may itself execute the biometric validation operations without transmitting the biometric data to a biometrics validation entity computer.

Alternatively, if a biometric template is not already stored in association with the user, the processor computer 104, biometrics validation entity computer A 108A, and/or biometrics validation entity computer B 108B may validate the biometric template based on additional information received from the user. For example, the user may present a picture identification along with entering his biometric sample. The system may store the validated biometric template for future validation operations.

At step S105B, the processor computer 104 may transmit at least a subset of the configuration data to an interaction entity computer (e.g., interaction entity A 110A, interaction entity B 110B, interaction entity C 110C, interaction entity D 110D, interaction entity E 110E, or interaction entity F 110F). The interaction entity computer may execute operations to validate the received configuration data. As an example, the configuration data may include a payment account to use for buying gasoline. The interaction entity computer may analyze the configuration data to determine whether the payment account is valid and whether the user is an authorized user of the account.

At step S105C, the processor computer 104 may execute notification validation operations. The notification validation operations may ensure that notifications are received by the user. For example, a test message may be sent to the user for confirmation.

At step S107, the processor computer 104 may transmit the configuration parameters to configuration database 106. The processor computer may further transmit indicators that the biometrics validation, interaction validation, and/or notification validation has been completed.

Figure 2:
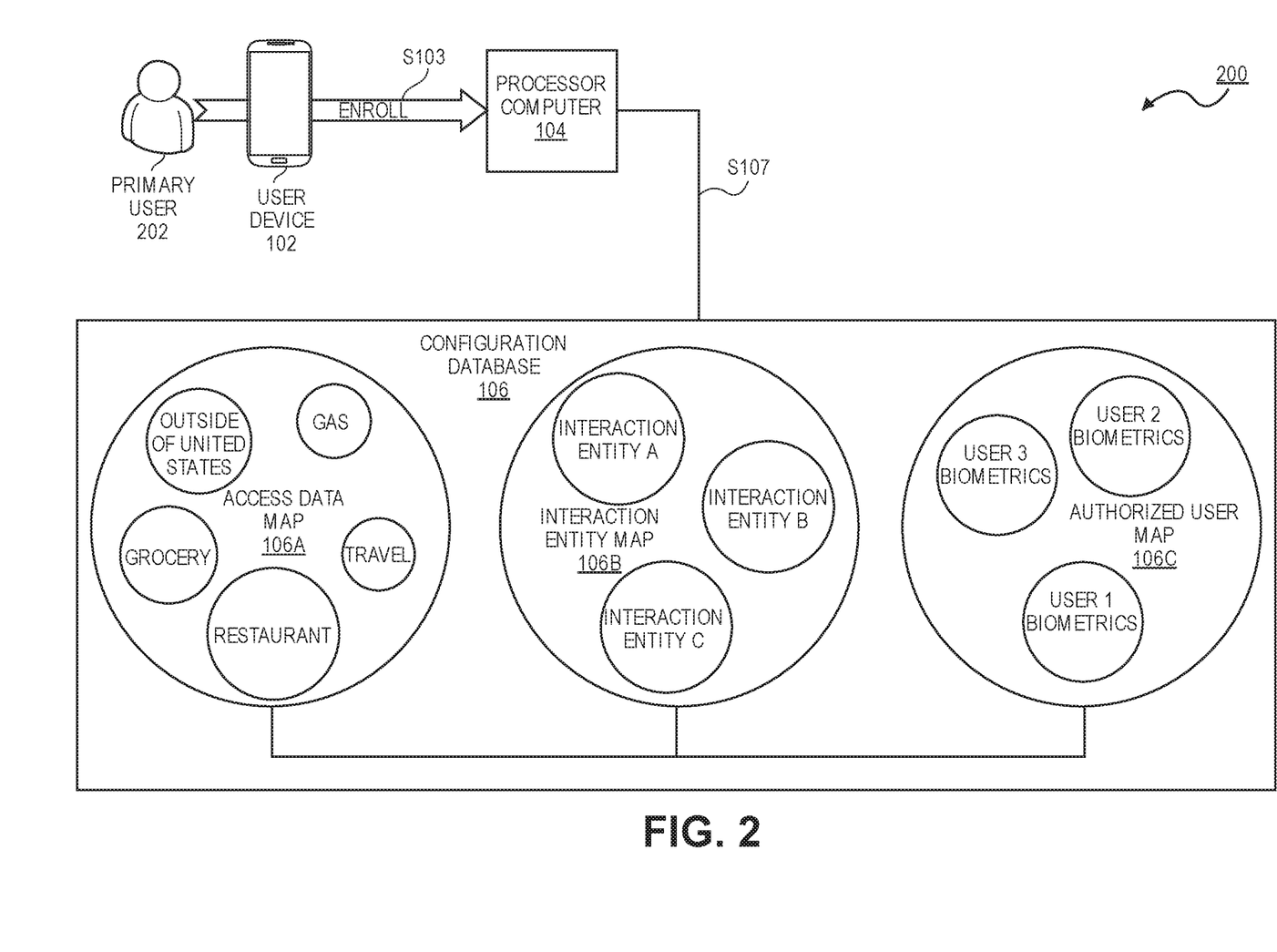
FIG. 2 shows example configuration data stored to a configuration database according to some embodiments.

FIG. 2 shows example configuration data that may be stored to the configuration database 106. As described above with respect to FIG. 1, a user may initially transmit configuration data to processor computer 104 via user device 102 (S103). The processor computer 104 may transmit the configuration data to the configuration database 106 for storage (S107).

The configuration data may be generated by a primary user 202. The primary user 202 may manage the configurations associated with additional authorized users. As shown in FIG. 2, the authorized user map 106C includes three authorized users (User 1, User 2, and User 3). For example, the primary user 202 may be User 1, User 2 may be the spouse of the primary user 202, and User 3 may be the child of the primary user 202. The configuration database 106 stores a biometric template for each of the respective authorized users (User 1 Biometrics, User 2 Biometrics, and User 3 Biometrics).

The configuration database 106 may further store an access data map 106A. The access data map 106A may include various access data parameters. The access data parameters may include location data, types of resource providers, transaction amounts, types of goods or services, etc. For example, as shown in FIG. 2, access data parameters may include categories such as "Outside of United States," "Gas," "Grocery," "Restaurant," and "Travel." The access data map 106A may further be configurable based on specific access data parameters (e.g., "Joe's Grocery"). As another example, access data parameters may include a merchant category code (MCC) which is generally a four-digit number assigned to a merchant by a payment processing network when the merchant begins to accept electronic methods of payment such as credit cards, debit cards, and the like. Generally, a MCC may classify a merchant by the type of goods or services it provides. Some merchants (e.g., large merchants that sell many types of goods and/or services) may be assigned a plurality of MCCs.

The configuration database 106 may further store an interaction entity map 106B. The interaction entity map 106B may include various interaction entities, as described above with respect to FIG. 1. In the example shown in FIG. 2, three interaction entities (Interaction Entity A, Interaction Entity B, and Interaction Entity C) are stored. Storing an interaction entity may comprise storing an identifier of the interaction entity, an identifier of one or more records or accounts associated with the interaction entity, contact information for the interaction entity, etc.

The configuration database 106 may store mappings between the access data, authorized users, and interaction entities. For example, the primary user 202 may configure: for grocery purchases, use credit card X; for travel purchases, use credit card Y; for gas purchases, use bitcoin account Z; for purchases made by User 2, use debit account.

The configuration database 106 may further store user-configured controls. For example, the configuration database may accept and store thresholds for spending in a particular time period and category (e.g., $300 a month limit on groceries; $1,500 annual limit on entertainment). As another example, the configuration database may accept and store one or more interaction entities to use for a particular spend category (e.g., for restaurants, first choice=credit card A, second choice=credit card B, third choice=checking account). As another example, the configuration database may accept and store thresholds for alerting the user (e.g., send alert if transaction amount exceeds $500) or declining the transaction (e.g., decline all transactions over $1,000 at a retail store). These rules may be specific to one or more of a set of authorized users. For example, a son can spend up to $50 in a grocery store while a spouse can spend up to $300 in a grocery store. These rules may map to the biometric template of each respective user.

IV. Processor Computer

Figure 3:
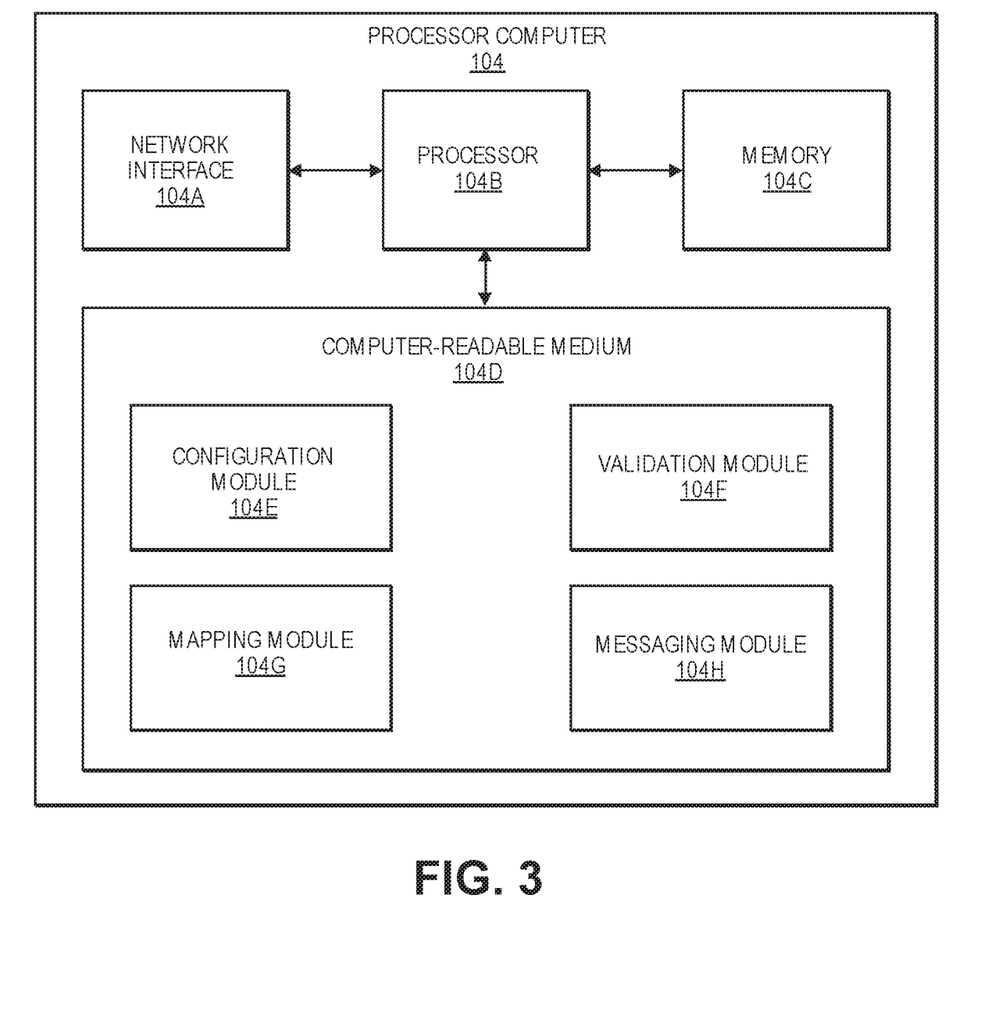
FIG. 3 shows a block diagram illustrating some system components in greater detail according to some embodiments.

FIG. 3 shows a detailed view of the processor computer 104. The processor computer 118 may include a processor 104B operatively coupled to a network interface 104A, a memory 104C, and a computer-readable medium 104D.

For simplicity of illustration, a certain number of components are shown in FIG. 3. It is understood, however, that embodiments may include more than one of each component. In addition, some embodiments may include fewer than or greater than all of the components shown in FIG. 3.

The network interface 104A can be configured to connect to one or more communication networks to allow processor computer 104 to communicate with other entities such as the user device 102, the configuration database 106, the interaction entities, the biometrics validation entities, etc.

The processor 104B may be implemented as one or more integrated circuits (e.g., one or more single core or multicore microprocessors and/or microcontrollers). The processor 104B may be used to control the operation of the processor computer 104. Processor 104B can execute a variety of programs in response to program code or computer-readable code stored in memory 104C. Processor 104B may include functionality to maintain multiple concurrently executing programs or processes.

The memory 104C may be implemented using any combination of any number of non-volatile memories (e.g., flash memory) and volatile memories (e.g., DRAM, SRAM), or any other non-transitory storage medium, or a combination of media.

In some embodiments, the computer-readable medium 104D comprises code, executable by the processor 104B, to implement a method comprising: receiving, by a message processing system, an authorization request message from an access device, the authorization request message comprising a biometric template and access data; retrieving, by the message processing system from a configuration database, an interaction entity record identifier associated with an interaction entity from among a plurality of different interaction entities that process messages in different message formats; initiating, by the message processing system, validation of the biometric template; upon a determination that the biometric template is valid, then converting the authorization request message from a first format to a second format, the second format being compatible with message processing by the interaction entity; transmitting the authorization request message in the second format to the interaction entity; receiving, by the message processing system, an authorization response message in the second format from the interaction entity; converting the authorization response message from the second format to the first format; and transmitting, by the message processing system, the authorization response message in the first format to the access device.

The computer-readable medium 104D may comprise one or more non-transitory media for storage and/or transmission. Suitable media include, as examples, a random access memory (RAM), a read only memory (ROM), a magnetic medium such as a hard-drive or a floppy disk, or an optical medium such as a compact disk (CD) or DVD (digital versatile disk), flash memory, and the like. The computer-readable medium 104D may be any combination of such storage or transmission devices.

The computer-readable medium 104D may comprise software code stored as a series of instructions or commands The computer-readable medium 104D may comprise a configuration module 104E, a validation module 104F, a mapping module 104G, and a messaging module 104H.

The configuration module 104E may include code for managing user configuration. The configuration module 104E may include functionality to accept user input comprising configuration parameters. The configuration module 104E may include functionality to convert the received input into computer-readable mappings and store such mappings to the configuration database 106.

The validation module 104F may include code for managing validation operations. The validation module 104F may include functionality to initiate validation, either directly or via a request to a biometrics validation entity computer (e.g., biometrics validation entity computer A 108A and/or biometrics validation entity computer B 108B). The validation module 104F may be communicatively coupled to a memory for storing biometric templates (e.g., the configuration database 106). The validation module 104F may include a matching algorithm for comparing a first biometric template (e.g., a received biometric template) with a second biometric template (e.g., one of the stored biometric templates) to determine a match result. For example, the validation module 104F may include code for determining whether a received biometric template matches a biometric template stored in association with a particular user.

The mapping module 104G may be configured to use a matching algorithm to identify a mapping based on a received biometric template. The mapping module 104G may include code to compare the received biometric template with a plurality of stored biometric templates to identify the matching stored template. The mapping module 104G may identify one or more mappings corresponding to the stored template.

The mapping module 104G may comprise code for identifying switch information based on an identified mapping and received access data. The mapping module 104G may include functionality to query the configuration database using access data parameters to retrieve the switch data according to the identified mapping. For example, the mapping module 104G may be configured to query the configuration database 106 to identify an appropriate payment account for beverage purchases made by a particular user.

The messaging module 104H may comprise code for preparing and transmitting messages. The messaging module 104H may further be configured to accept and analyze messages. The messaging module 104H may include functionality to receive and transmit messages containing biometric data (e.g., biometric templates and/or biometric samples), access data, and/or switch information. The messaging module 104H may be configured to prepare and transmit notifications (e.g., upon determining that a spending limit has been reached in a category).

The processor computer 104 may further include data processing subsystems, networks, and operations used to support and deliver authorization services, exception file services, and clearing and settlement services. For example, the processor computer 104 may comprise a server coupled to a network interface (e.g., by an external communication interface), and databases of information. The processor computer 104 may be representative of a transaction processing network. An example transaction processing network may include VisaNet™. Transaction processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

V. Switching Computer

Figure 4:
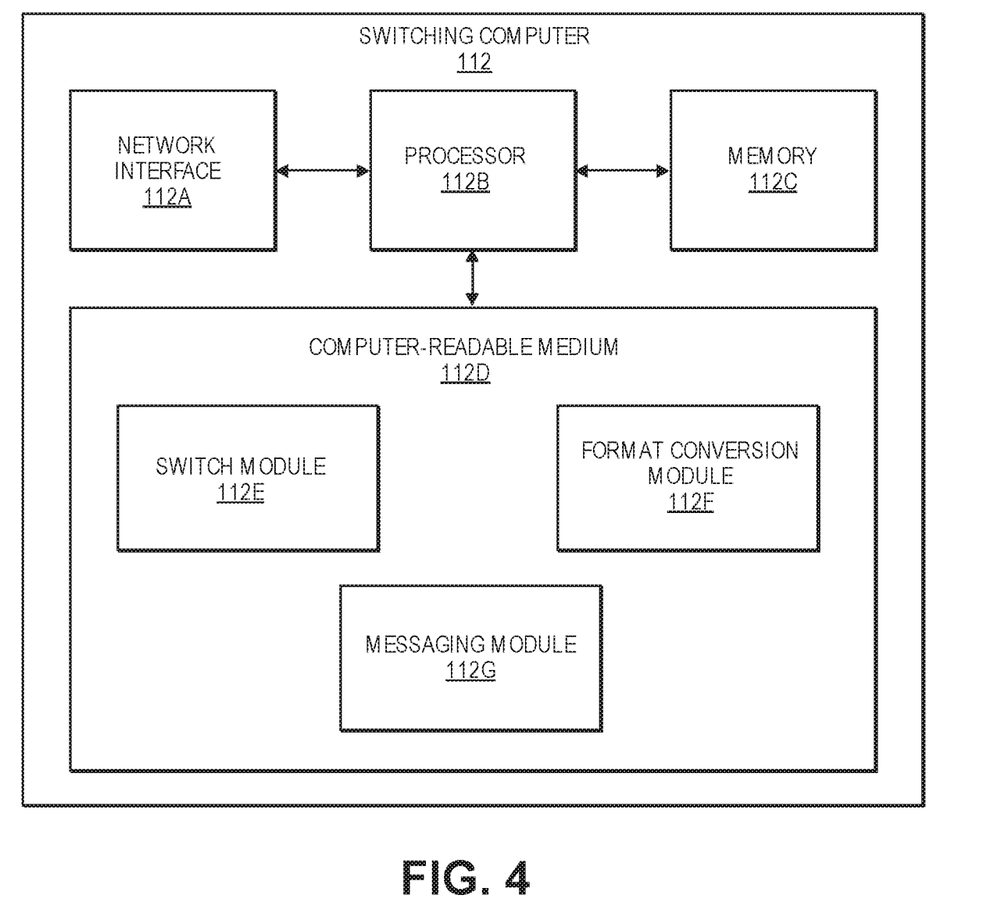
FIG. 4 shows a block diagram illustrating some system components in greater detail according to some embodiments.

FIG. 4 shows a detailed view of the switching computer 112. The switching computer 112 may include hardware and/or software configured to receive a biometrics-based authorization request message and switch information from processor computer 104. The switching computer 112 may include functionality to switch the biometrics-based, interaction-entity agnostic authorization request message to a format specific to a particular interaction entity specified in the switch information. The switching computer 112 may include a processor 112B operatively coupled to a network interface 112A, a memory 112C, and a computer-readable medium 112D.

For simplicity of illustration, a certain number of components are shown in FIG. 4. It is understood, however, that embodiments may include more than one of each component. In addition, some embodiments may include fewer than or greater than all of the components shown in FIG. 4.

The network interface 112A can be configured to connect to one or more communication networks to allow switching computer 112 to communicate with other entities such as the access device 114, the processor computer 104, the interaction entities, etc.

The processor 112B may be substantially similar to the processor 104B, described above with respect to FIG. 3. The memory 112C may be substantially similar to the memory 104C, described above with respect to FIG. 3.

The computer-readable medium 112D may comprise one or more non-transitory media for storage and/or transmission. Suitable media include, as examples, a random access memory (RAM), a read only memory (ROM), a magnetic medium such as a hard-drive or a floppy disk, or an optical medium such as a compact disk (CD) or DVD (digital versatile disk), flash memory, and the like. The computer-readable medium 112D may be any combination of such storage or transmission devices.

The computer-readable medium 112D may comprise software code stored as a series of instructions or commands The computer-readable medium 112D may comprise a switch module 112E, a format conversion module 112F, and a messaging module 112G.

The switch module 112E may include code for switching the authorization request message from an interaction-entity-agnostic message to an authorization request message that specifies a specific interaction entity. The switch module 112E may further modify the message and/or associated metadata to specify an interaction identity record (e.g., a bank account, securities account, credit line, etc.). An interaction identity record may be specified by an interaction identity record identifier (e.g., a bank account number, credit card number, bitcoin key, etc.). The switch module 112E may include functionality to accept switch information from the processor computer 104 and/or configuration database 106 (e.g., via the messaging module 112G). The switch module 112E may include functionality to parse the switch information and/or transmit the switch information to the format conversion module 112F.

The format conversion module 112F may include code for converting a message from a first format (i.e., the received format) to a second format (i.e., the format compatible with message processing by the interaction entity). The format conversion module 112F may be configured to identify an appropriate format. The format conversion module may be configured to access stored mappings of formats to interaction entities and/or types of interaction entities. The format conversion module may include parsing software to parse the received access data to retrieve data elements for inclusion in the message in the second format. The format conversion module may include templates for messages in the second format.

The messaging module 112G may comprise code for preparing and transmitting messages. The messaging module 112G may further be configured to accept and analyze messages. The messaging module 112G may include functionality to receive messages comprising switch information. The messaging module 112G may include functionality to parse received messages and pass switch information to the switch module 112E. The messaging module may be configured to receive messages from the format conversion module 112F, identify the appropriate destination for the messages, and transmit them to the appropriate destination.

VI. Transaction Processing

Figure 5:
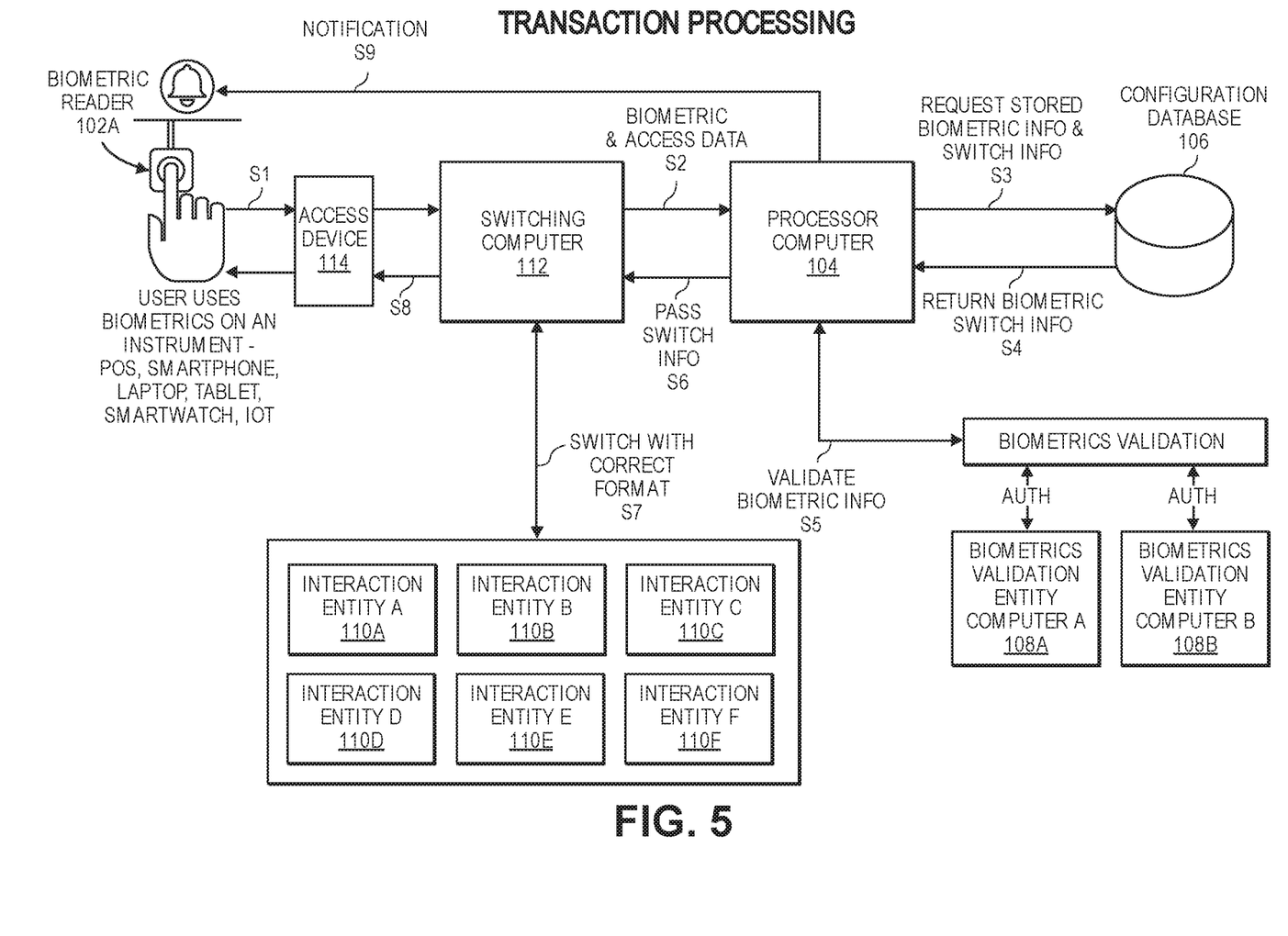
FIG. 5 shows a system and method for transaction processing according to some embodiments.

FIG. 5 shows a system and a method according to some embodiments. Additional methods and processes may be included within these methods and may be recognized by one of ordinary skill in the art, in light of the description below. Further, in some embodiments, the described methods may be combined, mixed, and matched, as one of ordinary skill would recognize.

At step S1, a user may initiate a transaction. The user may request access to a resource. The user may enter information into user device 102 and/or access device 114. The request may result in the creation of access data, wherein the access data may include transaction information such as a resource provider name, transaction amount, data associated with a request to enter a building, a type of location to travel to, or any other suitable data.

Upon requesting access to the resource, the user may be prompted to enter biometrics. Via the biometric reader 102A, the user device 102 and/or access device 114 may capture a biometric sample of the user. In some embodiments, the user device 102 or access device 114 may initially display a message. The displayed message may relay information asking the user to enter a biometric sample and may state "scan fingerprint," "hold camera up to face," "enter biometric," or any other suitable statement. The user device 102 (or access device 114) may convert the biometric sample into a biometric template. If the biometric template and access data are collected at the user device 102, the user device 102 may transmit the biometric template and the access data to the access device 114.

At step S2, The access device 114 prepares and transmits an authorization request message to the message processing system. The authorization request message may comprise the biometric template and at least a subset of the access data. The access device 114 may transmit the authorization request message to the processor computer 104 directly. Alternatively, the access device 114 may transmit the authorization request message to the switching computer 112, and the switching computer 112 may forward the data to the processor computer 104. The authorization request message may be transmitted in a message in any suitable format (e.g., extensible markup language (XML), an international organization for standardization (ISO) 20022, etc.).

As an example the authorization request message may include the following data fields:

```
<TRANSACTION>
<PAYEE IDENTIFICATION>
    <DIGITAL BIOMETRICS/>
</PAYEE IDENTIFICATION>
<ACCESS DATA>
    <TRANSACTION ID/>
    <TRANSACTION TIME/>
```

-continued

```
<PAYMENT INITIATION DATA>
    <PAYMENT INITIATOR NAME/>
    <PAYMENT INITIATOR ADDRESS/>
    <PAYMENT INITIATOR ROUTING INFORMATION/>
</PAYMENT INITIATION DATA >
<TRANSACTION AMOUNT/>
    <TAX/>
    <MCG/>
    <MCC/>
    <CURRENCY>
    <DEBIT/CREDIT/>
    <RECURRING/>
    <FREQUENCY/>
    <COMMENTS/>
    <INSTALLMENT PLAN/>
</ACCESS DATA>
</TRANSACTION>,
``` where the payee identification may uniquely identify the user. The payee identification may comprise a data field for digital biometrics (e.g., a biometric template). The digital biometrics may be used to uniquely identify the user that initiated the transaction. The access data fields may correspond to various transaction details such as a transaction identifier, a transaction time, a tax amount or percentage, and a currency. The access data may further comprise a merchant category group (MCG) and/or merchant category code (MCC). The access data may specify whether the transaction should be processed as debit or credit. The access data may specify whether the payment is recurring, and if so, a frequency for the recurring payment. The access data may comprise installment plan information (e.g., 5 payments of $29.99; payment 4/5). The message may further include a data field for comments.

At step S3, the processor computer 104 may request information from the configuration database 106. The processor computer may transmit, to the configuration database 106, any necessary data for identifying the information, such as some or all of the received access data and the biometric template. The processor computer 104 may execute a query to the configuration database based on the access data and biometric template. For example, for a given biometric template, the processor computer may request an interaction entity identifier corresponding to one or more of 1 P.M., gas station, and 94122 zip code.

The processor computer 104 may identify a stored biometric template which is a best match to the received biometric template by searching a set of stored biometric templates based on characteristics of the biometric template received from the user in association with the transaction. The processor computer 104 may use a matching algorithm to compare the received biometric template to a plurality of stored biometric templates until a match is detected.

Based on the stored biometric template, the processor computer 104 may identify a set of mappings stored in association with the biometric template. The processor computer 104 may query the set of mappings based on the access data received in the authorization request message. For example, the received access data may specify a gasoline purchase made in California. The processor computer may identify, in the configuration database 106, a mapping that specifies that for gasoline purchases made in California, the user wants to use a particular account at Bank of California. Based on the identified mapping, the processor computer 104 may identify switch data specifying an interaction entity and any other transaction parameters specified by the mapping. The switch data may specify the interaction entity using an interaction entity identifier (e.g., the name "Bank of California," a routing number, etc.). The switch data may further specify an interaction entity record identifier which specifies to a particular record (e.g., a bank account number or a key for a cryptocurrency account). The switch data may further include additional user-defined parameters (e.g., reject transaction if amount exceeds $500).

At step S4, the processor computer 104 retrieves, from the configuration database 106, the identified switch data. The processor computer 104 may further retrieve the stored biometric template for further validation.

At step S5, the processor computer 104 may initiate validation of the biometric template to authenticate the user. The processor computer 104 may initiate validation of the biometric template by transmitting the received biometric template and/or the stored biometric template to a biometrics validation entity computer (e.g., biometrics validation entity computer A 108A or biometrics validation entity computer B 108B). Alternatively, or additionally, the processor computer may initiate validation of the biometric template by executing validation operations.

The validation operations executed by biometrics validation entity computer A 108A, biometrics validation entity computer B 108B, and/or processor computer 104 may include comparing the received biometric template with a stored biometric template. The biometrics may be validated using a matching algorithm. The output of the matching algorithm may be a match result. If the match result shows that the received biometric template and the stored biometric template match, then the processor computer 104 may determine to continue with the method.

In some embodiments, if the match result shows that the first biometric template and the second biometric template do not match, then the processor computer 104 may generate an "invalid" notification. The "invalid" notification may be transmitted to the access device 114 and/or user device 102 to be displayed. The "invalid" notification may be any suitable message informing the user that the biometric templates do not match. For example, the "invalid" notification may be achieved through display of text such as "biometric does not match," "no match," "invalid user," or the like. In the case the validation is executed by a biometrics validation entity computer, the biometrics validation entity computer may return a result to the processor computer 104.

At step S6, the processor computer 104 may pass the retrieved switch information to the switching computer 112. The switch information may be passed, along with access data, in any suitable format. In some embodiments, the processor computer 104 may pass the switch information and any pertinent access data to the switching computer in the form of an authorization request message. Alternatively, the processor computer 104 may transmit the switch information in a stand-alone message.

At step S7, switching computer 112 converts the authorization request message from a first format to a second format, the second format being compatible with message processing by the interaction entity.

The switching computer 112 may identify a message format, based on the interaction entity or type of interaction entity to receive the authorization request message. The format may further depend on a type of processing selected (e.g., if debit, credit, or ACH processing is available to retrieve funds from a bank account). The interaction entity or interaction entity type may be specified, explicitly or implicitly, in the switch information received from the configuration database. For example, the switch information may specify an interaction entity identifier or an interaction entity type code. The switching computer 112 may use the interaction entity information to identify the message format by locating a stored mapping. For example, the type of interaction entity is bank and the type of processing is bank transfer. The parameters bank+bank transfer map to the message format "ACH."

The switching computer 112 may identify data elements to include in the translated authorization request message, based on the second message format and/or the received access data. For example, ISO messages destined for a bank in association with a line of credit are characterized by a specific set of data fields such as transaction amount, merchant ID, timestamps, and the like. The required data elements for inclusion in the message, as well as the available data elements in the received access data, are identified.

The switching computer 112 may parse the identified data elements from the authorization request message in the first format. For example, the switching computer 112 may extract data such as a timestamp, transaction amount, etc., from the authorization request message in the first format.

The switching computer 112 may generate an the authorization request message in the second format. The switching computer 112 may retrieve a stored template. The switching computer 112 may have access to a plurality of templates including headers, blank data fields, and/or the like, corresponding to the necessary formats, such as FIX, SWIFT, ISO-2022, FpML, xBRL, SEPA, epics, and other protocols. The switching computer 112 may insert the parsed data elements into the appropriate data fields to generate the authorization request message in the second format.

As an example, if the rules identified specify that the second format should be ACH, then the switching computer 112 converts the message to ACH format: 101 0420000131999999999YYMMDD0810A094101MYBANK Bank Your Company Name 00000000
where the message comprises a file header, a batch header, a standard entry class, an effective data, a description, a routing number, an account number, and an amount. The ACH message is a fixed-width, 94 character ASCII file.

In some embodiments, the switching computer 112 may initially convert the authorization request message to a generic messaging format such as ISO 20022. The switching computer may then convert the generic message to the second interaction-entity-specific format as described above.

The switching computer 112 may transmit the authorization request message, in the second format, to the interaction entity. The interaction entity may process the received message and prepare an authorization response message specifying whether the transaction is approved or declined (i.e., whether access to the resource should be granted or refused). The authorization response message may be in the second format (e.g., the native format of the interaction entity).

The switching computer 112 may receive the authorization response message in the second format from the interaction entity. The switching computer 112 may convert the authorization response message from the second format to the first format.

The switching computer 112 may identify the second message format. Based on the second message format, the switching computer 112 may identify and parse data elements from the authorization response message (e.g., transaction amount, merchant ID, timestamps, etc.).

The switching computer 112 may generate an the authorization response message in the first format. The switching computer 112 may retrieve a stored template corresponding to the first format. The switching computer 112 may insert the parsed data elements into the appropriate data fields to generate the authorization response message in the first format.

At step S8, switching computer 112 transmits the authorization response message in the first format to the access device 114. The access device 114 may grant or refuse access to the resource based on the authorization response message. The access device 114 may proceed with the transaction if the authorization result was to approve. If the authorization result was to decline the access to the resource, then the access device 114 may display or transmit a message indicating that the transaction is declined.

VII. Reporting

The system may further generate detailed reports accessible by the user. Because the system mediates transactions across multiple interaction entities, the system has the ability to give the user a single view of all the user's funds, without the need for the user to grant account access to a third-party as is required in some prior systems.

The system may generate reports based on a time period (e.g., monthly, weekly, or yearly). The system may organize reports based on user (e.g., the primary user and/or one or more additional authorized users). The system may organize reports based on the interaction entity and/or interaction entity record (e.g., a particular bank or bank account). The reports may allow a user to view all transactions over a time period in one place. The reports may further provide an analysis of spending categories, and may specify whether spending in any of the categories exceeds a threshold.

The reports may be accessible in association with the interface used for configuration (as detailed above with respect to FIG. 1). For example, a finance manager application on the user's phone may be used to configure the payment sources. The finance manager application may further include functionality to display reports.

VIII. Example Embodiment

The following example is described for purposes of clarity. Components and/or operations described in the example are specific examples which may not be applicable to certain embodiments, and should not be construed as limiting the scope of any of the claims.

A primary account holder ("user 1") enrolls an authorized user ("user 2"). User 1 sets up the following rule set for user 2, which is stored in association with biometrics of user 2:
1) User 2 may spend $60 every month on beverages using a bank account with interaction entity 1. The rule is set with a warning threshold at $10—this means that user 1 will get an in-app as well as email alert/SMS message as soon as the balance for the month drops to $10 in the beverage category. User 1 sets a red alert at $5, which means a red alert balance communication will be sent to user 1 and user 2 when the balance in the account drops to $5. User 1 also sets up a rule to deny any excess spend in the beverage category, which means that if user 2 were to exceed a $60 monthly spend in the beverage category, then the system will deny the transaction. The system will authenticate the bank account information through an ACH check transaction and SMS PIN authentication.

2) Alcoholic beverages (e.g., wine, beer, and liquor categories) are excluded for user 2.
3) User 2 may spend $100 every month on groceries from an account with interaction entity 2. The rule is set with a warning threshold at $20—this means that user 1 will get an in-app as well as email alert/SMS message as soon as the balance for the month drops to $20 in the grocery category. User 1 sets a red alert at $5, which means a red alert balance communication will be sent to user 1 and user 2 when the balance in the account drops to $5. User 1 also sets up a rule to approve an excess of 20% over the budgeted amount for the month on groceries.
4) User 2 may spend $20 every month on gas using a prepaid account with interaction entity 3. The prepaid account is linked to user 1's bank account and fills in increments of $20 with a not-to-exceed amount of $200. This means that user 2 could spend more than $20, but only in increments of $20 and not more than $200 over the whole month. Every increment results in red alert warning to both users.

User 2 goes to the point of purchase and uses his biometrics to make a purchase of $85 for some fruit. The system validates the biometrics of user 2 with the rules in the repository and checks whether the purchase conforms to the rules attached to the user's biometrics in the purchase category. If the purchase conforms to the rules, then the transaction is routed to interaction entity 2.

The system deducts the amount from user 2's balance for the month. Now user 2 has a balance of $15 to spend on groceries for the month. The system periodically monitors for settlement of the transaction for 5-6 days since this is a credit card transaction. If no settlement of the transaction is found, then the system restores the balance. If settlement of the transaction is found, then the system makes the $15 balance permanent for the month. If no settlement transaction is seen, the balance is restored to the $100 level. Chargebacks and Returns also restore balance.

User 2 makes a gas purchase for $10 using his biometrics. The system validates user 2's biometrics, and then switches that transaction to interaction entity 3.

User 2 attempts to buy wine for $50 using his biometrics. The system identifies the rules based on a biometrics match for user 2. The identified rule is to not to allow user 2 to purchase alcoholic beverages. The system sends a decline. An alert is sent out to user 1 for the decline.

User 2 attempts to spend $10 on coffee using his biometrics. The system matches the biometrics to the rule set and switches the transaction to interaction entity 2. On successful authorization, user 2's balance will be reduced by $10 in the beverage category.

User 1 looks at her online Manager App and is able to see spending in all categories at a monthly level. User 1 may reclassify purchases if needed.

IX. Advantages

Embodiments of the disclosure have a number of advantages. A user can pay as a person using her biometrics. There is no need to carry a wallet, phone, or any other gadgets to make payments. Rules can be used to control the use of funds by user/purchase category and thresholds. These rules can be set up by the user at an initial time, such that, when conducting a transaction, the user does not need to make a decision about which payment instrument to use. This saves steps for the user as well as the payment processing system. For example, instead of providing biometrics, opening a digital wallet on a mobile device, selecting a credit card, and tagging the mobile device to an access device, the user simply provides biometrics.

Embodiments of the disclosure have an additional number of advantages. The transaction process may initially be fund-source agnostic. Whether the source of funds is a bank account, line of credit, or prepaid balance, users can set rules as to what source of funds will be used in what order based of purchase category and users. Similarly, since authentication is executed based on biometrics, the system will be network and issuer agnostic. This can improve the functioning of the transaction processing system overall by obviating the need to route the authentication messages, pre-authorization, and other messages commonly needed to the appropriate parties. Processing resources and time are both saved by implementing the methods described herein.

Embodiments of the disclosure have an additional number of advantages. Using the methods and systems disclosed, it is possible to process transactions start-to-finish without issuing cards, tokens, and the like. A transaction can be initiated based on biometrics and tied to an appropriate interaction entity through predefined rules. This can obviate the need for card art, marketing, and other expenses for issuers. Further, the transactions can be processed without the need for information such as bank identification numbers (BINs) and licensing information. Accordingly, resources are spared as various numbers and physical cards no longer need to be generated and tracked.

Further, the system is fraud and risk averse, as the payment is initiated with biometrics unique to the user. Further, the first portion of the message processing, including user authentication, is done without passing account information of the user. There is no account number being passed in the messages, thus the account number is not vulnerable to snooping.

X. Computer Apparatus

It should be understood that any of the embodiments can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments using hardware and a combination of hardware and software.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to some embodiments may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the embodiments will become apparent to those skilled in the art upon review of the disclosure. The scope of the embodiments should, therefore, be determined not with reference to the above description, but instead should be determined with reference to the pending claims along with their full scope or equivalents.

One or more features from any embodiment may be combined with one or more features of any other embodiment without departing from the teachings of this disclosure.

A recitation of "a," "an," or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
   receiving, by a message processing system, an authorization request message from an access device, the authorization request message comprising a biometric template and access data;
   retrieving, by the message processing system from a configuration database, an interaction entity record identifier associated with an interaction entity from among a plurality of different interaction entities that process messages in different message formats;
   initiating, by the message processing system, validation of the biometric template;
   upon a determination that the biometric template is valid, then converting the authorization request message from a first format to a second format, the second format being compatible with message processing by the interaction entity;
   transmitting the authorization request message in the second format to the interaction entity;
   receiving, by the message processing system, an authorization response message in the second format from the interaction entity;
   converting the authorization response message from the second format to the first format; and
   transmitting, by the message processing system, the authorization response message in the first format to the access device.

2. The method of claim 1, wherein the message processing system comprises a processor computer and a switching computer in operative communication with each other.

3. The method of claim 1, further comprising receiving and storing, prior to the authorization request message, configuration data mapping the plurality of different interaction entities to a respective plurality of access data parameters.

4. The method of claim 3, wherein the interaction entity is selected, from a plurality of interaction entities, based on the stored configuration data.

5. The method of claim 3, wherein the access data parameters comprise one or more of: location data, an amount, a user of a set of users, or a type of resource provider.

6. The method of claim 1, wherein the biometric template corresponds to one or more of: fingerprint data, retinal data, facial data, or voice data.

7. The method of claim 1, wherein the access device grants or refuses access to a resource based on the authorization response message received from the message processing system.

8. A message processing system comprising:
   a processor; and
   a non-transitory computer-readable medium coupled to the processor, the non-transitory computer-readable medium comprising code, executable by the processor, to implement a method comprising:
   receiving, by the message processing system, an authorization request message from an access device, the authorization request message comprising a biometric template and access data;
   retrieving, by the message processing system from a configuration database, an interaction entity record identifier associated with an interaction entity from among a plurality of different interaction entities that process messages in different message formats;
   initiating, by the message processing system, validation of the biometric template;
   upon a determination that the biometric template is valid, then converting the authorization request message from a first format to a second format, the second format being compatible with message processing by the interaction entity;
   transmitting the authorization request message in the second format to the interaction entity;
   receiving, by the message processing system, an authorization response message in the second format from the interaction entity;
   converting the authorization response message from the second format to the first format; and
   transmitting, by the message processing system, the authorization response message in the first format to the access device.

9. The message processing system of claim 8, wherein the message processing system comprises a processor computer and a switching computer in operative communication with each other.

10. The message processing system of claim 8, the method further comprising receiving, prior to the authorization request message, configuration data mapping the plurality of different interaction entities to a respective plurality of access data parameters.

11. The message processing system of claim 10, wherein the interaction entity is selected, from a plurality of interaction entities, based on the configuration data.

12. The message processing system of claim 10, wherein the access data parameters comprise one or more of: location data, an amount, a user of a set of users, or a type of resource provider.

13. The message processing system of claim 8, wherein the biometric template corresponds to one or more of: fingerprint data, retinal data, facial data, or voice data.

14. The message processing system of claim 8, wherein the access device grants or refuses access to a resource based on the authorization response message received from the message processing system.

15. A non-transitory computer readable medium comprising code, executable by a processor, configured to:
receive, by a message processing system, an authorization request message from an access device, the authorization request message comprising a biometric template and access data;
retrieve, by the message processing system from a configuration database, an interaction entity record identifier associated with an interaction entity from among a plurality of different interaction entities that process messages in different message formats;
initiate, by the message processing system, validation of the biometric template;
upon a determination that the biometric template is valid, then convert the authorization request message from a first format to a second format, the second format being compatible with message processing by the interaction entity;
transmit the authorization request message in the second format to the interaction entity;
receive, by the message processing system, an authorization response message in the second format from the interaction entity;
convert the authorization response message from the second format to the first format; and
transmit, by the message processing system, the authorization response message in the first format to the access device.

16. The medium of claim 15, wherein the message processing system comprises a processor computer and a switching computer in operative communication with each other.

17. The medium of claim 15, further comprising receiving, prior to the authorization request message, configuration data mapping the plurality of different interaction entities to a respective plurality of access data parameters.

18. The medium of claim 17, wherein the interaction entity is selected, from a plurality of interaction entities, based on the configuration data.

19. The medium of claim 17, wherein the access data parameters comprise one or more of: location data, an amount, a user of a set of users, or a type of resource provider.

20. The medium of claim 15, wherein the access device grants or refuses access to a resource based on the authorization response message received from the message processing system.

\* \* \* \* \*